United States Patent [19]

Moskovitz

[11] Patent Number: 5,050,819
[45] Date of Patent: Sep. 24, 1991

[54] ROTATABLE NON-CIRCULAR FOREBODY FLOW CONTROLLER

[75] Inventor: Cary A. Moskovitz, Blacksburg, Va.

[73] Assignee: The United states of America as represented by the Administrator of the National Aeronautics and Space Administration, Washington, D.C.

[21] Appl. No.: 565,090

[22] Filed: Aug. 10, 1990

[51] Int. Cl.$^5$ .............................................. B64C 19/00
[52] U.S. Cl. .................... 244/75 R; 244/87; 244/88; 244/199; 244/120
[58] Field of Search ..................... 244/87, 88, 89, 120, 244/75 R, 3.21, 3.1, 199, 213

[56] References Cited

U.S. PATENT DOCUMENTS

| | | | |
|---|---|---|---|
| 2,872,137 | 2/1959 | Gluhareff | 244/120 |
| 3,069,112 | 12/1962 | Patterson | 244/120 X |
| 4,786,009 | 11/1988 | Rao et al. | 244/75 R |
| 4,896,846 | 1/1990 | Strom | 244/75 R |

Primary Examiner—Galen Barefoot
Assistant Examiner—Carla Mattix
Attorney, Agent, or Firm—George F. Helfrich

[57] ABSTRACT

The invention is a rotatable, non-circular forebody flow controller. The apparatus comprises a small geometric device located at a nose of a forebody of an aircraft or missile. The geometric device has a circular base that fits flush upon the remaining forebody of the aircraft and a non-circular cross-sectional area that extends toward the apex of the aircraft. The device is symmetrical about a reference plane and preferably attaches to an axle which in turn attaches to a rotating motor. The motor rotates the device about an axis of rotation. Preferably, a control unit connected to an aircraft flight control computer signals to the rotating motor the proper rotational positioning of the geometric device.

12 Claims, 5 Drawing Sheets

ROTATABLE NON-CIRCULAR FOREBODY FLOW CONTROLLER

ORIGIN OF THE INVENTION

The invention described herein was made in the performance of work under NASA Grant No. NCC1-46. In accordance with 35 U.S.C. 202, the grantee elected not to retain title.

BACKGROUND OF THE INVENTION

1. Field of the Invention

The present invention relates generally to aircraft and projectile flight controls, and more specifically, to rotatable, non-circular forebody shapes for yaw control at high angles of attack.

2. Description of the Related Art

Interest continues in improving the performance of fighter aircraft and missiles at high angles of attack. Fighter aircraft engaged in aerial combat must make aggressive maneuvers, particularly during one-on-one combat with other fighter aircraft. These aggressive maneuvers frequently require deceleration to low speeds and high angles of attack.

A major factor which limits the effectiveness of current fighter aircraft at high angles of attack is the degradation of rudder yaw control as the angle of attack increases. The level of yaw control provided by a conventional rudder decreases as the angle of attack increases because the vertical tail becomes immersed in a low-energy stalled wake generated by the wing, but the magnitude of yaw control required increases due to the higher yaw rates needed to coordinate rolling maneuvers at higher angles of attack. Reduced maneuverability of the aircraft results because the amount of yaw control required exceeds the amount available, thereby restricting the aircraft to an angle of attack substantially less than the angle for maximum lift.

On the other hand, the forebody of an aircraft at high angles of attack remains in flow undisturbed by the wings and creates a pair of powerful vortices. For most modern fighter aircraft, the moment arm from the forwardmost point of the forebody to the center of gravity is equal to or greater than the movement arm of the vertical tail or tails. The forebody is thus well-suited for placement of control surfaces which take advantage of the powerful vortex flow field and the long moment arm, and the forebody has become an increasingly important factor in aircraft design.

One attempt to control the vortex generated by the forebody at high angles of attack uses jet blowing to influence the direction of the naturally occuring vortex asymmetry in order to effect yaw control. While research has shown promise for jet blowing as a means of forebody control, jet blowing requires a source of high pressure air. This source normally comes from engine bleed air. Use of engine bleed air, however, can significantly reduce available engine thrust at a time in the maneuver when the aircraft needs maximum thrust.

Another method of generating moments at high angles of attack involves attaching nose strakes to the slender forebodies of missiles or aircraft. For example, longitudinally hinged forebody strakes provide large yawing moments at high angles of attack. A modern fighter aircraft, however, normally has a forebody with complex curvatures and cross-sections that vary along the length, making design and fabrication of longitudinally hinged forebody strakes technically difficult and expensive. Further, the radial location of hinged strakes determines the ranges of effectiveness with the angle of attack and the sideslip angle. Hinged strakes fixed at a predetermined radial location would thus limit the ranges of effectiveness. Longitudinally hinged forebody strakes may also adversely affect the performance of a radar unit mounted in the forebody.

Actuated forebody strakes are an alternative to longitudinally hinged strakes. This art, disclosed in U.S. Pat. No. 4,917,333, comprises an active control device that uses strakes which can be actuated, deflected, or rotated to provide the necessary direction and magnitude of yawing moment. Such a device, however, does not manipulate the naturally occurring vortices at the forebody but rather creates entirely new vortices.

SUMMARY TO THE INVENTION

An object of the invention is to provide a control surface that uses the forebody vortex flow field to produce a source of yaw power over a wide range on angle of attack and sideslip angle.

Another object of the invention is to provide a control surface that manipulates the naturally occurring vortices at the forebody of an aircraft to generate regular and predictable forebody side forces of a desired sign and magnitude.

A further object of the invention is to provide a control surface which can be rotated to generate a controlled vortex asymmetry, thereby providing the direction and magnitude of yawing moment required.

Yet another object of the invention is to provide a control surface that ensures the availability of large amplitude side forces for moderate angles of attack.

The present invention attains the foregoing and additional objects by providing an apparatus for yaw control at moderate to high angles of attack. The apparatus comprises a small geometric device located at the nose of the forebody of an aircraft or missile. The geometric device has a circular base that fits flush upon the rest of the forebody of the aircraft and a series of non-circular cross-sectional area that extend toward the apex. The device is symmetrical about a reference plane and preferably attaches to a connecting means or axle which in turn attaches to a rotating means such as a motor. The motor rotates the device about an axis of rotation. Preferably, a flight control drives the motor so that the motor properly positions the geometric device, but the pilot of the aircraft may also directly control the device.

The present invention performs well as a directional control device for aircraft and missiles at moderate to high angles of attack. Even at moderate angles of attack the invention furnishes forebody side forces of high amplitude. For wind tunnel tests of models with slender forebodies, the invention generates a stable and more predictable forebody vortex flow field.

DESCRIPTION OF THE PREFERRED EMBODIMENT

Figure 1:
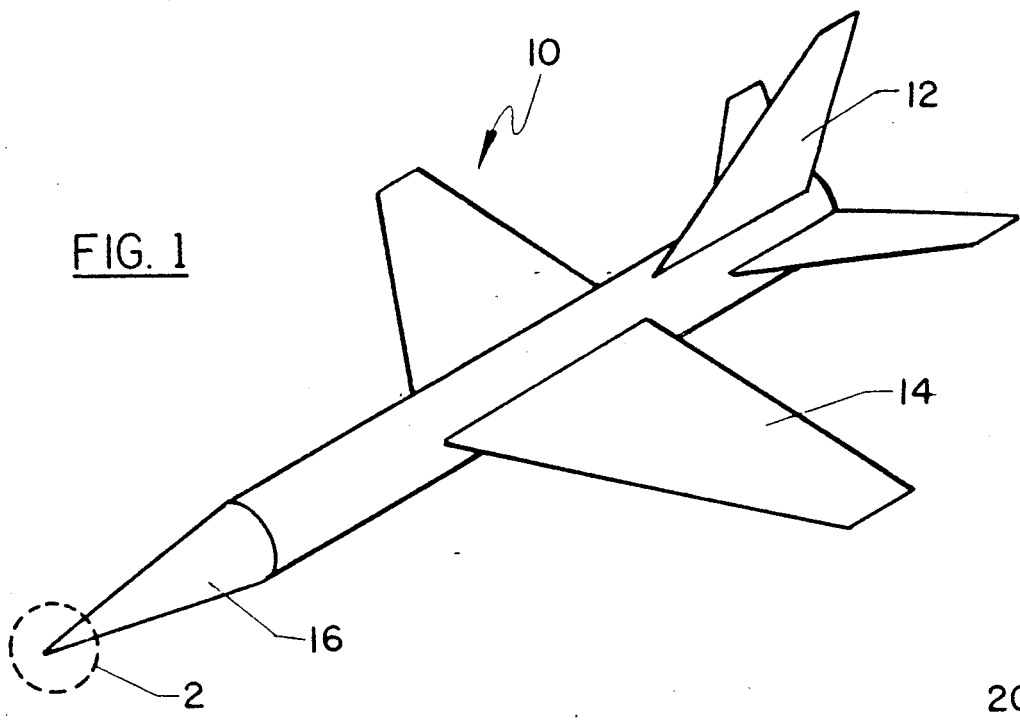
FIG. 1 is a perspective view of an aircraft suitable for employment of the present invention.
Figure 2:
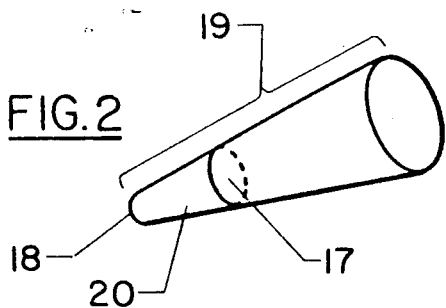
FIG. 2 is a perspective view of a forebody of the aircraft of FIG. 1 having a rotatable, geometric device of the present invention.

FIG. 1, an aircraft 10 has a vertical tail 12, wings 14 and a forebody 16. The aircraft 10 represents a fighter aircraft having trapezoidal wing configurations. The features and advantages of the present invention apply to aircraft generally but may also apply equally to space shuttles, rockets, missiles, or other projectiles. FIG. 2 shows forebody 16 with an apex 18 and a rotatable geometric device 20 of the present invention. FIG. 2 depicts forebody 16 as conically shaped, yet the principles of the present invention also apply to aircraft having other forebody configurations as well as other tails and wings, so long as forebody 16 has a circular cross-section 17 at some point along its length 19.

Figure 3:
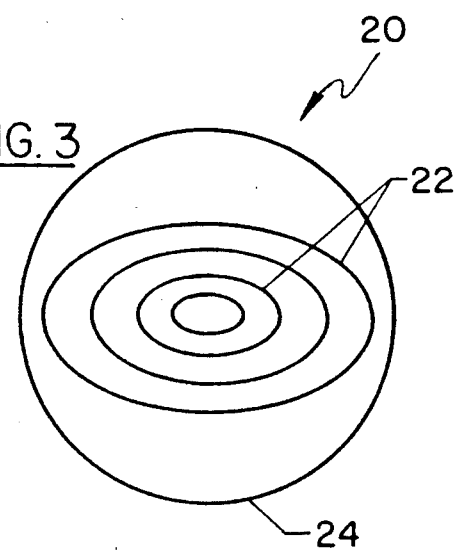
FIG. 3 is a front view of a rotatable, geometric device according to the present invention showing a series of cross-sectional cuts.
Figure 4:
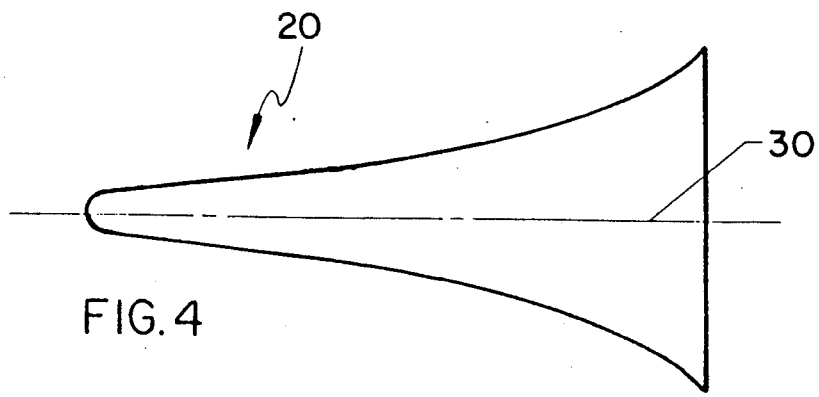
FIG. 4 is a side view of the rotatable, geometric device of the present invention.

FIG. 3 illustrates a series of cross-sectional cuts from a front view of a rotatable, geometric device 20 of the present invention, with a plurality of non-circular cross-sections 22 and a circular base 24 that fits flush upon the circular cross-section 17 of forebody 16. The plurality of non-circular cross-sections 22 extend from the circular base 24 to the apex 18. FIG. 4 presents a side view of the rotatable geometric device 20 with a reference plane 30. Reference plane 30 cuts horizontally through a centerline of the rotatable geometric device 20. Preferably, the plurality on non-circular cross-sections 22 are symmetrical about the reference plane 30, and the more preferably, each of the non-circular cross-sections are elliptical as indicated in FIG. 3.

Figure 5:
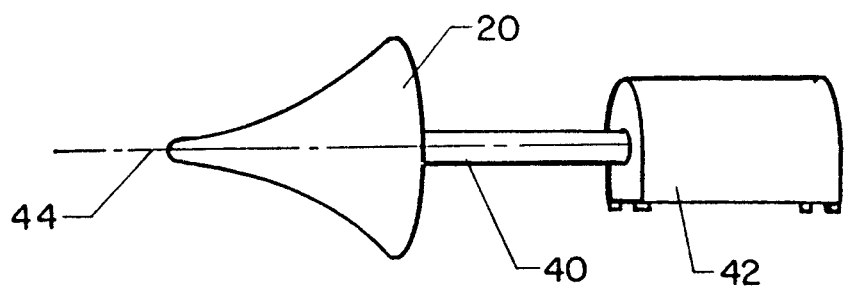
FIG. 5 is a perspective view of a rotatable, geometric device of the present invention connected to a rotating means.

Referring now to FIG. 5, the rotatable geometric device 20 has a connecting means 40 that rotatably connects the geometric device 20 to a rotating means 42 such as a motor. Both connecting means 40 and rotating means 42 may be mounted within geometric device 20 or mounted aft as shown. The rotating means 42 rotates the geometric device 20 about an axis of rotation 44, and preferably the rotating means 42 rotates the geometric device within a range of ±45°. The present invention performs better when the axis of rotation 44 lies in the reference plane 30.

Figure 6:
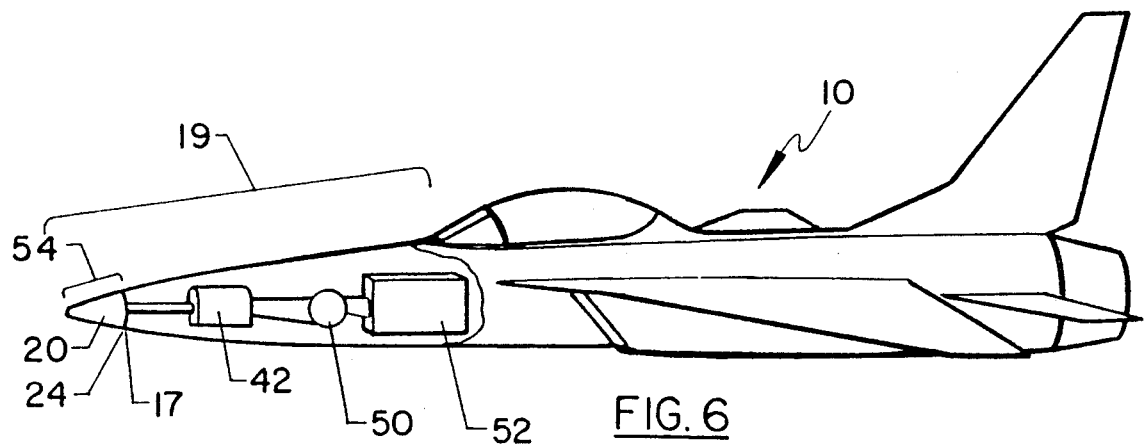
FIG. 6 shows the rotatable, geometric device according to the present invention assembled on the aircraft.

FIG. 6 shows the rotatable, geometric device 20 assembled on the aircraft 10, with circular base 24 fitting flush upon the circular cross-section 17 of forebody 16. Rotating means 42 preferably connects to a control means 50 such that the geometric device 20 moves into proper position. With control means 50, a pilot of aircraft 10 may directly control the positioning of geometric device 20, or control means 50 may connect to a flight control computer 52 that determines the desired position of geometric device 20 and then signals appropriate commands to control means 50.

As demonstrated in FIG. 6, the geometric device 20 has a relatively short length 54 when compared to the length 19 of forebody 16. Preferably, length 54 is three percent or less of the length 19. Because of its small size, geometric device 20 requires little on-board machinery to operate.

Figure 7A:
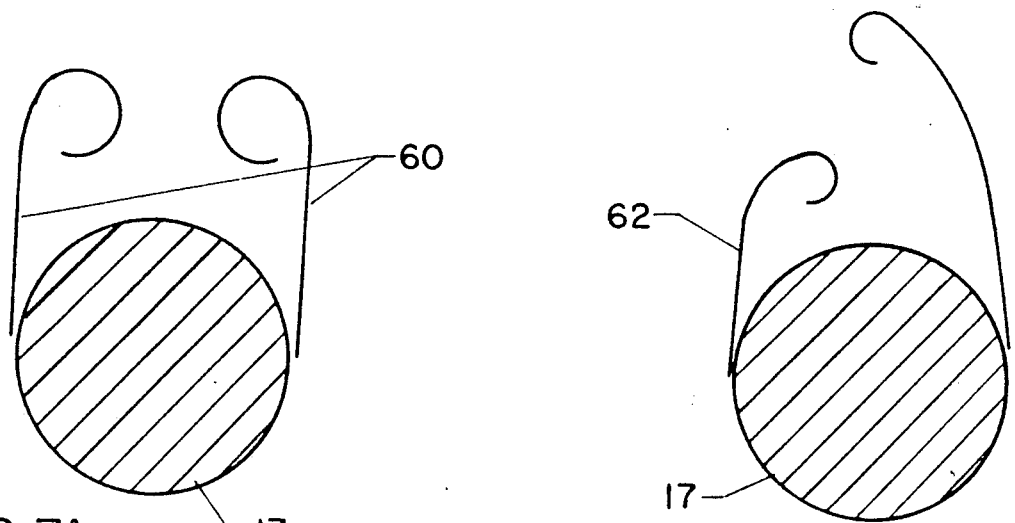
FIGS. 7A and 7B illustrate a vortex flow field for a circular cross-section at low and high angles of attack respectively.
Figure 7B:
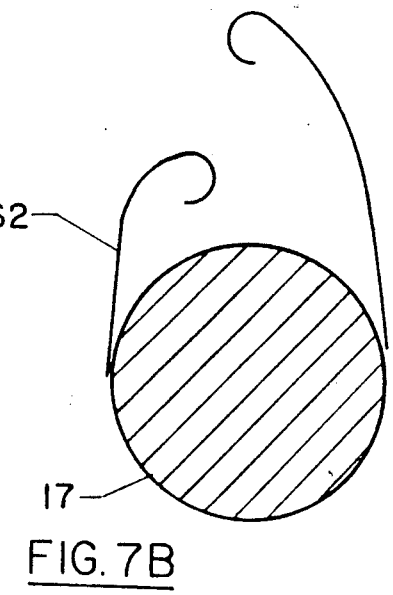
Figures 8A, 8B:
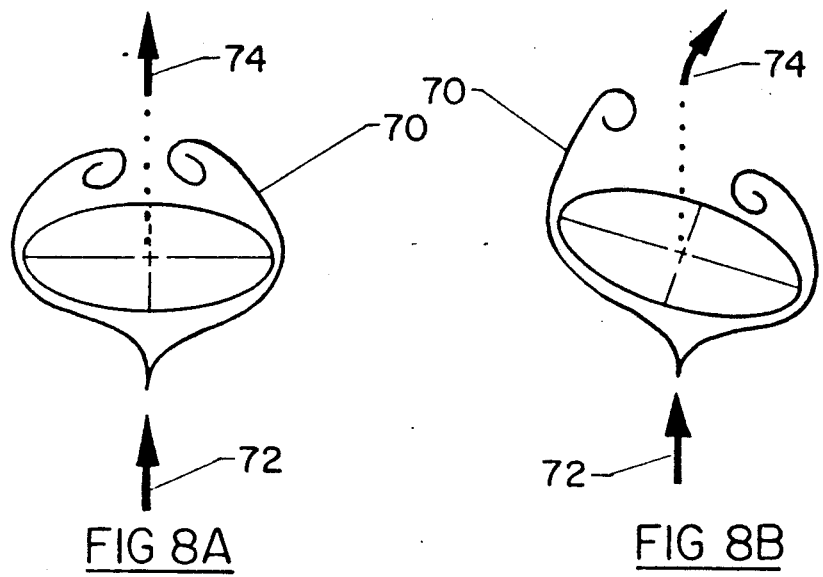
FIGS. 8A-8D demonstrate vortex flow fields for different roll positions of the geometric device of the present invention.
Figures 8C, 8D:
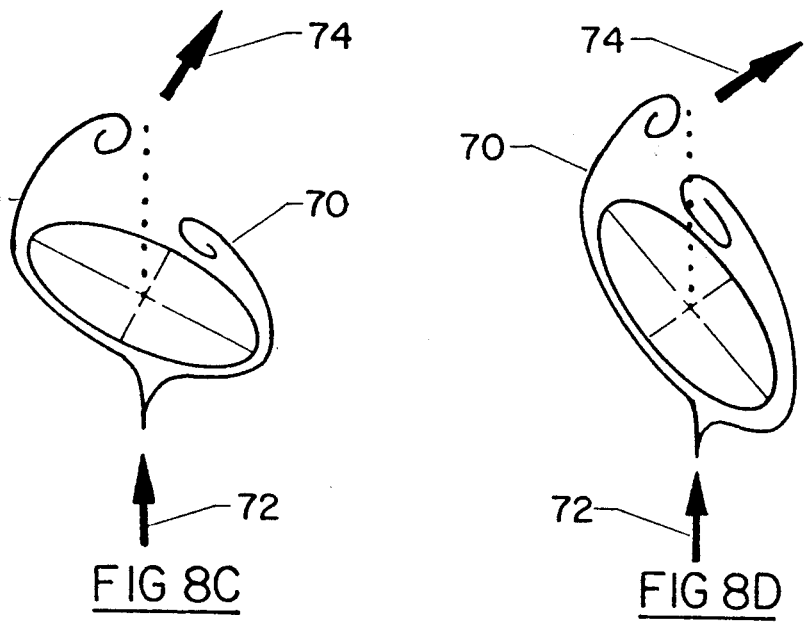

The present invention provides yaw control by manipulating the naturally occurring vortex flow field of the forebody 16 of aircraft 10. FIG. 7A illustrates normal vortices 60 for a circular cross-section 17 of forebody 16 at low angles of attack. At higher angles of attack, asymmetrical vortices 62 as seen in FIG. 7B result and contribute to directional instabilities of the aircraft 20. For conventional forebodies, vortex flow fields vary randomly with angle of attack and with roll position and thereby complicate directional control.

Figure 9:
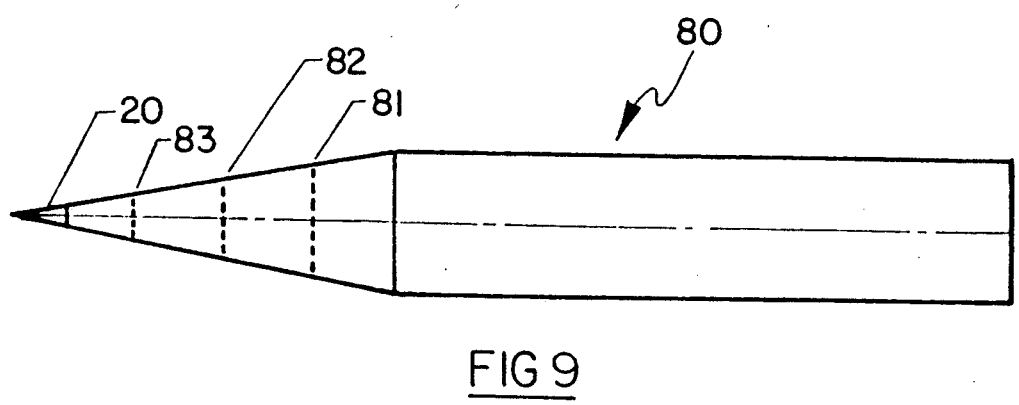
FIG. 9 shows a wind tunnel test model with circumferential pressure taps.

The present invention manipulates the naturally occurring vortex flow field to generate regular and predictable forebody side forces of a desired sign and magnitude. FIGS. 8A-8D reveal vortex flow fields 70 at flow direction 72 for different roll positions of $\phi_t$ of geometric device 20. The differing vortices 70 create differing net side forces 74 on forebody 16 which can be measured in a wind tunnel test using a test model 80 as shown in FIG. 9.

Test model 80 is a cone with a cylindrical afterbody and with a semi-cone angle of ten degrees. The model 80 has three circumferential rows 81, 82, and 83 of pressure taps spaced two and one-half inches apart from each other. Pressure measurements were performed at a freestream velocity of 45-feet per second corresponding to a Reynolds number of $8.4 \times 10^4$ based on a cylinder diameter of three and one-half inches.

Figure 10:
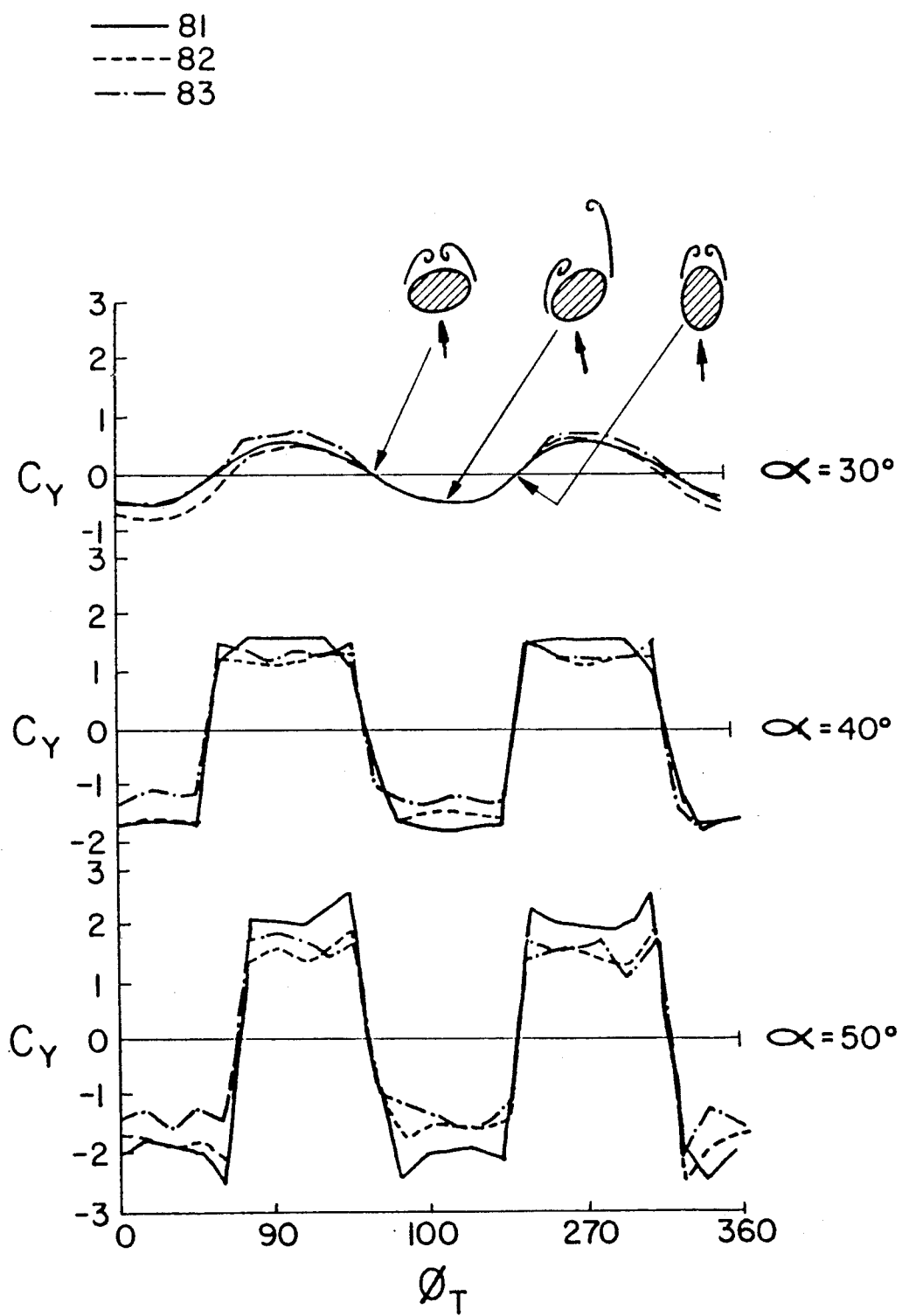
FIG. 10 presents a distribution of sectional side forces at varying angles of attack.
Figure 11:
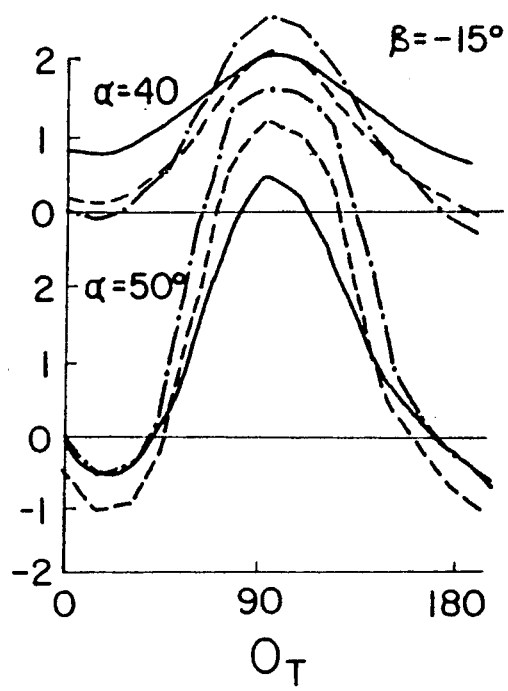
FIG. 11 shows a distribution of side forces at a large side slip angle.

Integration of the pressures measured by the test model results in a distribution of sectional side force 74 ($C_y$) as a function of roll position $\phi_t$. This distribution of sectional side force 74 ($C_y$) appears in FIG. 10 at angles of attack $\alpha$ from 30°-50° in increments of ten degrees. FIG. 10 illustrates that the present invention generates regular and predictable side forces 74 over a wide range of angle of attack, thereby producing a controllable source of yaw power for directional control. FIG. 11 shows that the geometric device 20 is effective also in generating restoring side forces 74 ($C_y$) at large side slip angles $\beta$.

Figure 12:
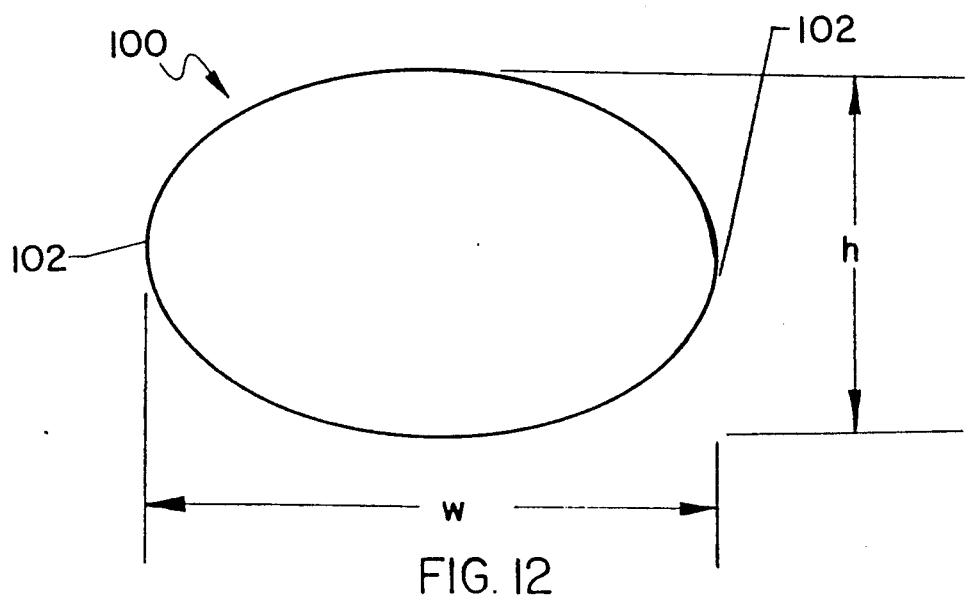
FIG. 12 illustrates a preferred cross-sectional shape of a device according to the present invention.

Referring now to FIG. 12, a preferred shape for each of the non-circular cross-sections 22 (see FIG. 3) is an elliptical shape 100 as shown. Each elliptical shape 100 has a width w and a height h, giving a width-to-height ratio of w/h. The width-to-height ratio should be greater than or equal to two in order for the geometric device to generate vortices from each side edge 102 of sufficient strength to manipulate the existing forebody vortices generated along forebody 16.

The present invention would be effective as an "add-on" device for any missile, rocket, space shuttle, or aircraft with a circular cross-section to match circular base 24 of geometric device 20. The invention could also be designed as part of a new aircraft.

While specific embodiments of the invention have been described herein, they are only exemplary of the novel features of the invention and are not exhaustive. Many variations and modifications of these specific examples will be readily apparent to those skilled in the art in light of the above teachings without departing from the scope of the appended claims. This invention may be practiced otherwise than as specifically described herein.

What is claimed is:

1. An apparatus for controlling yawing moment of an aircraft having a forebody with a circular cross-section and an apex, the apparatus comprising:
   a rotatable, geometric device having a circular base, the circular base of the geometric device fitting flush upon the circular cross-section of the forebody of the aircraft,
   the geometric device having a plurality of non-circular cross-sections that extend from the circular base thereof to the apex of the aircraft.

2. An apparatus according to claim 1, wherein the plurality of non-circular cross-sections of the geometric device are symmetrical about a reference plane.

3. An apparatus according to claim 1, further comprising:
   a connecting means and a rotating means, the connecting means rotatably connecting the geometric device to the rotating means, and the rotating means providing for rotation of the geometric device about an axis of rotation.

4. An apparatus according to claim 3, further comprising:
   a control means, the control means driving the rotating means such that the geometric device rotates into a predetermined position.

5. An apparatus according to claim 4, wherein the control means connects to a flight control computer in the aircraft.

6. An apparatus according to claim 3, wherein the plurality of non-circular cross-sections of the geometric device are symmetrical about a reference plane, and the axis of rotation of the geometric device lies in said reference plane.

7. An apparatus according to claim 6, further comprising:
   a control means, the control means driving the rotating means such that the geometric device rotates into a predetermined position.

8. An apparatus according to claim 6, wherein the plurality of non-circular cross-sections of the geometric device are elliptical in shape.

9. An apparatus according to claim 8, further comprising:
   a control means, the control means driving the rotating means such that the geometric device rotates into a predetermined position.

10. An apparatus according to claim 9, wherein the rotating means rotates the geometric device within a range of ±45°.

11. An apparatus according to claim 10, wherein the geometric device has a length equal to or less than three percent of the total length of the forebody of the aircraft.

12. An apparatus according to claim 9, wherein the plurality of elliptical cross-sections of the geometric device have a width-to-height ratio that is greater than or equal to two.

* * * * *